Figure 24:
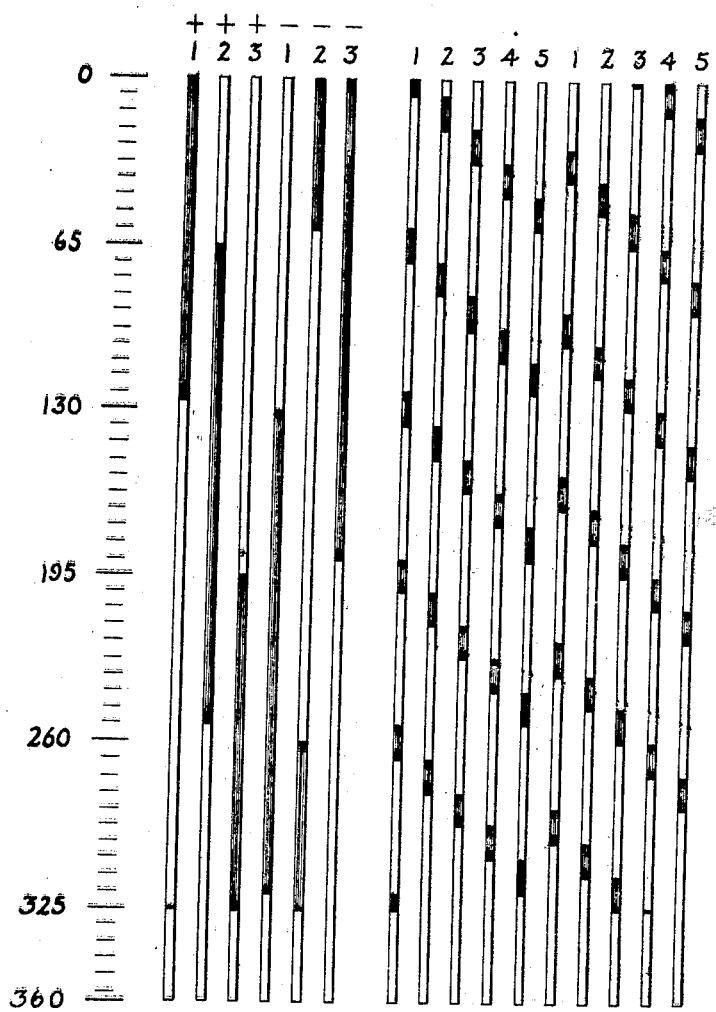

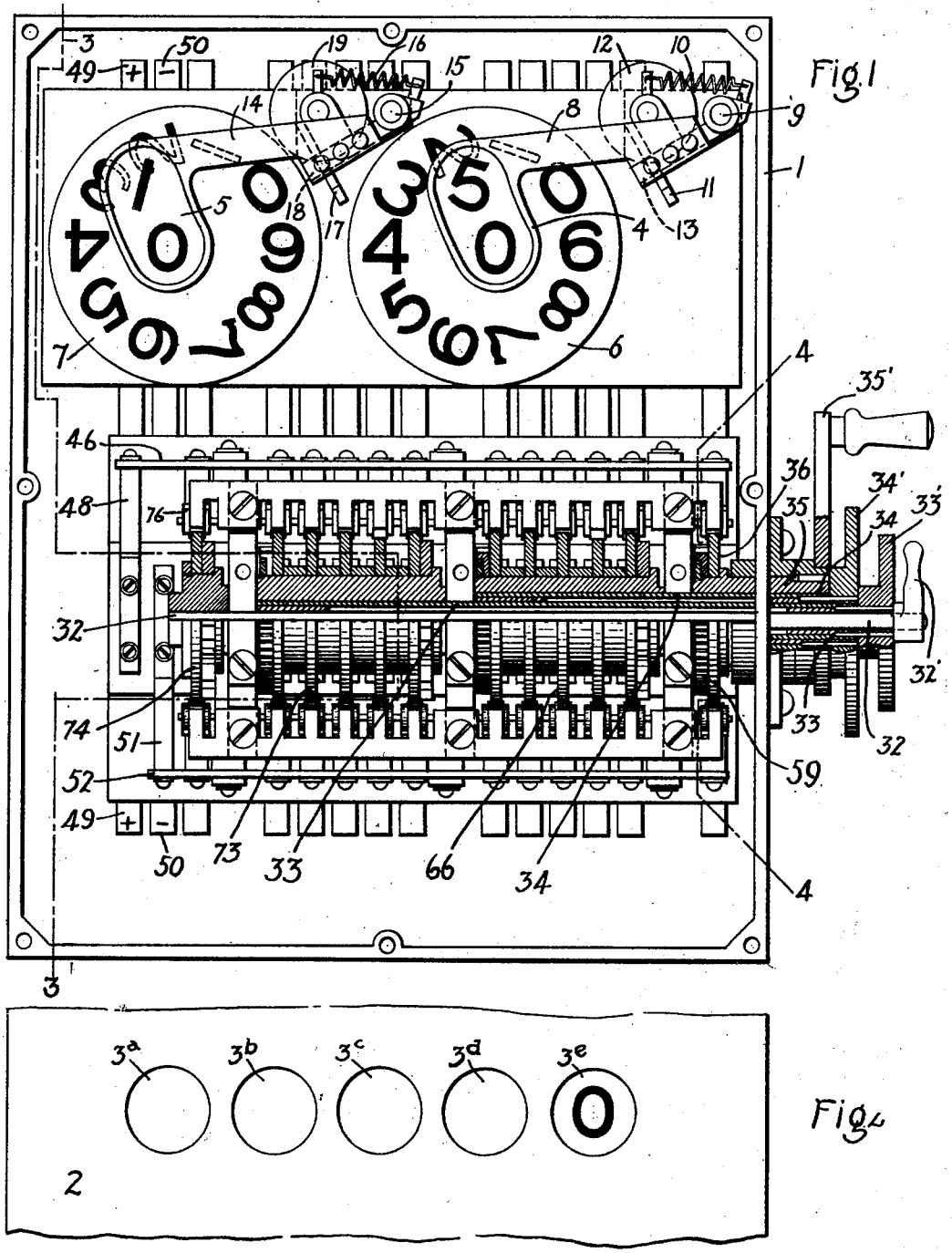

J. L. HALL.
APPARATUS FOR TRANSMITTING AND RECEIVING INFORMATION.
APPLICATION FILED OCT. 5, 1907.
956,960.
Patented May 3, 1910.
7 SHEETS—SHEET 2.
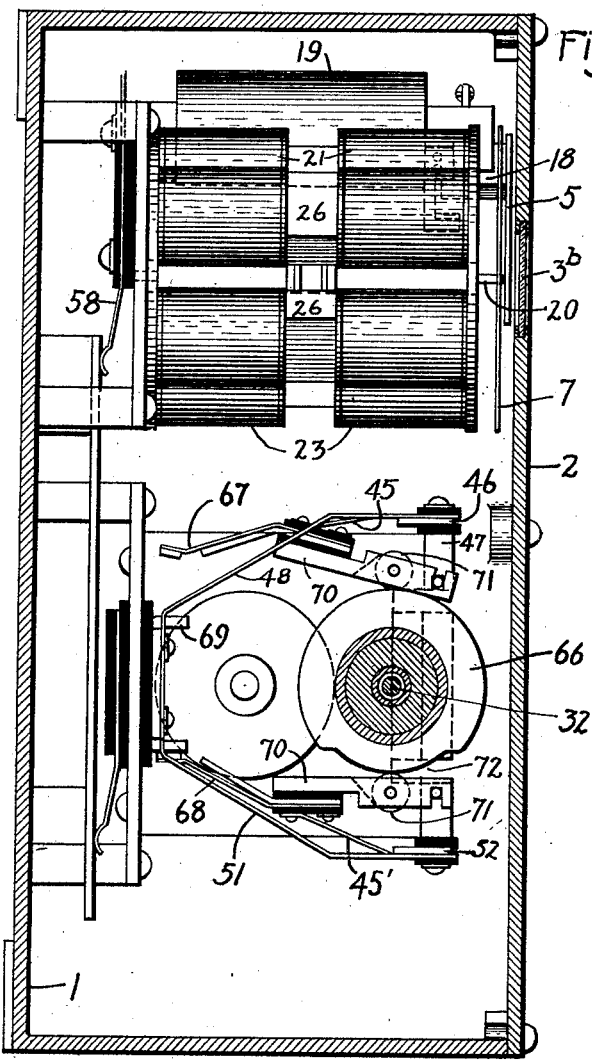
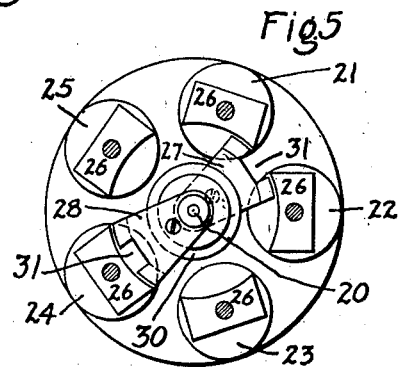
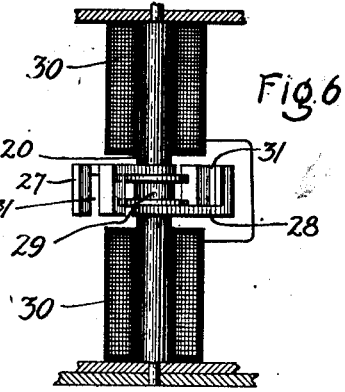
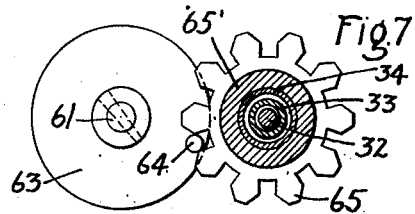
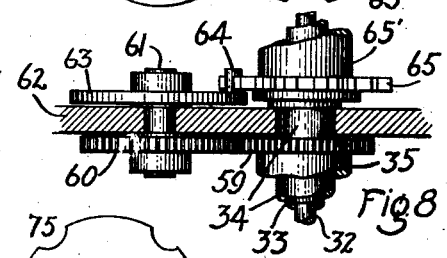
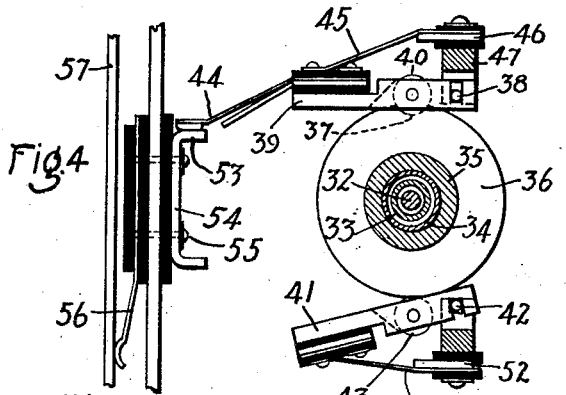
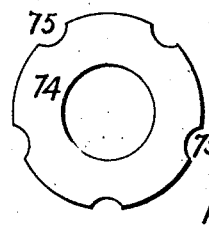
Witnesses:
Lloyd C. Bush
J. Ellis Glen
Inventor:
John L. Hall,
By Albright Davis
Atty.

J. L. HALL.
APPARATUS FOR TRANSMITTING AND RECEIVING INFORMATION.
APPLICATION FILED OCT. 5, 1907.
956,960.
Patented May 3, 1910.
7 SHEETS—SHEET 3.
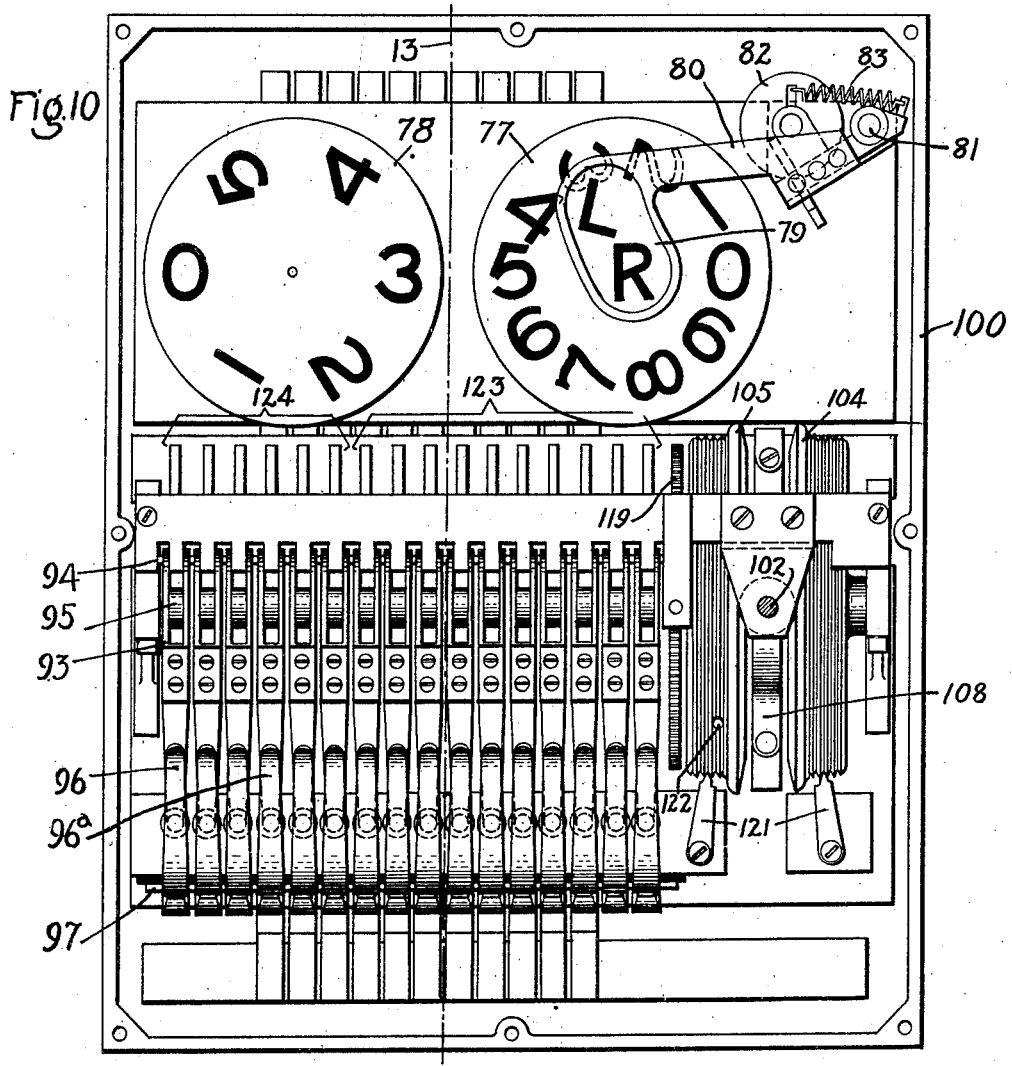
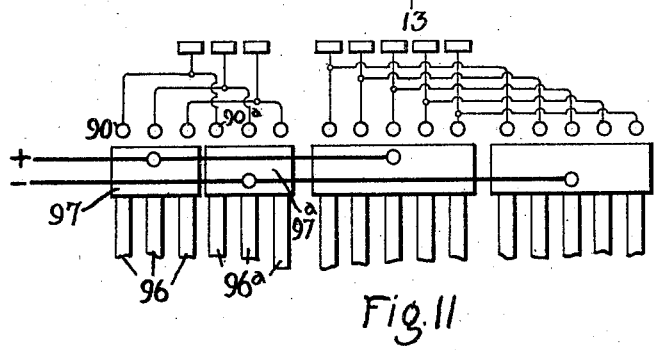
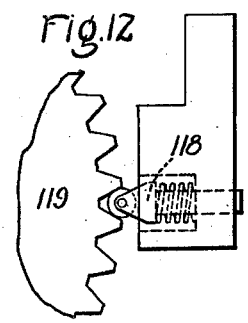
Witnesses:
Lloyd C. Bush
J. Ellis Glen
Inventor:
John L. Hall,
By Albert G. Davis
Atty.

J. L. HALL.
APPARATUS FOR TRANSMITTING AND RECEIVING INFORMATION.
APPLICATION FILED OCT. 5, 1907.
956,960.
Patented May 3, 1910.
7 SHEETS—SHEET 4.
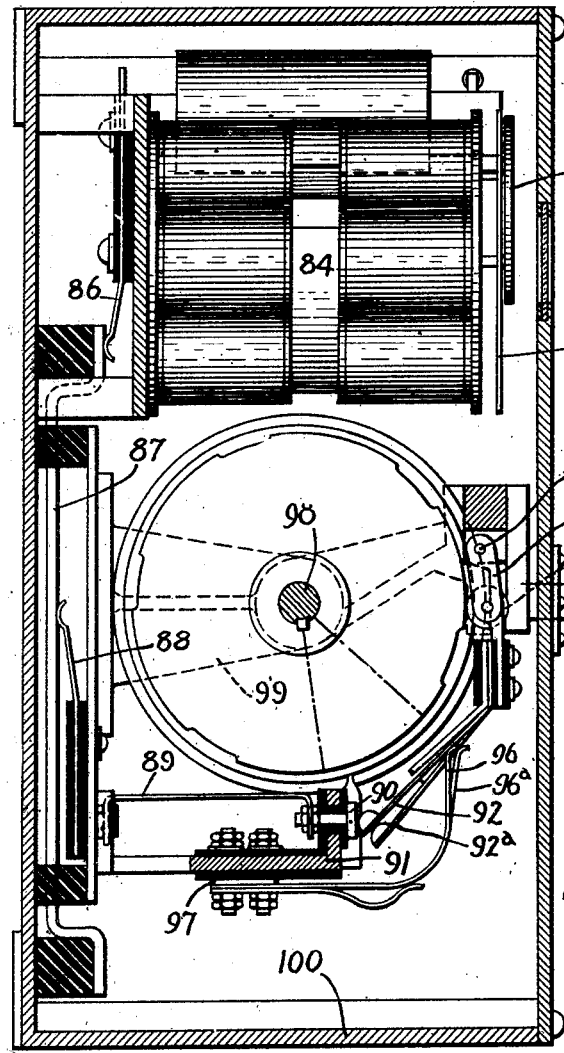
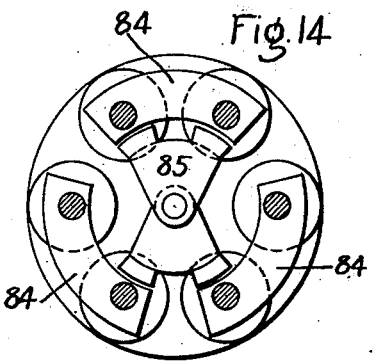
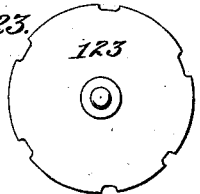
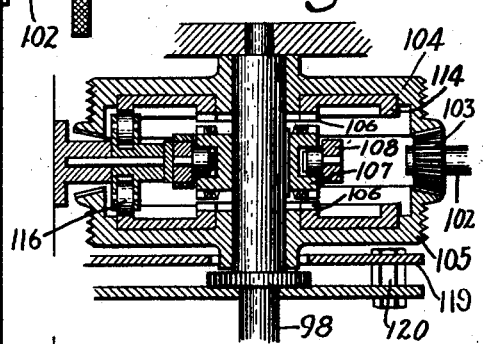
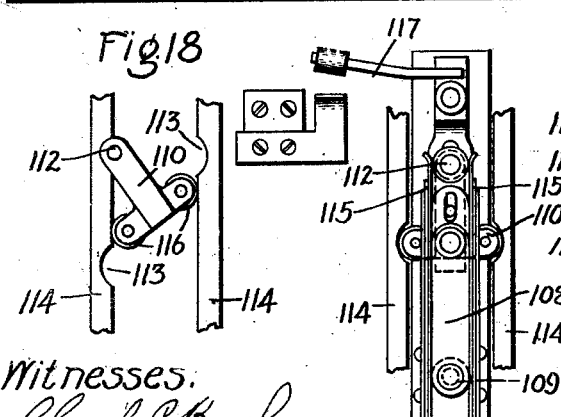
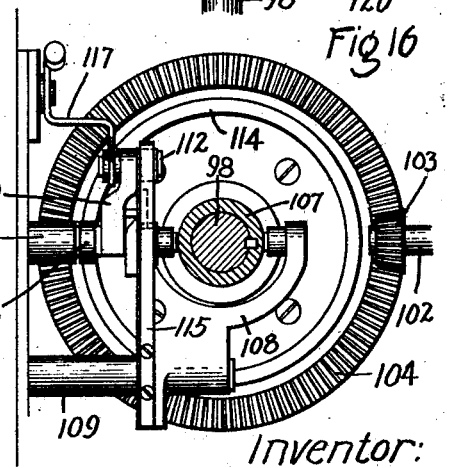
Witnesses:
Lloyd C. Bush
J. Ellis Glen
Inventor:
John L. Hall,
By Albert G. Davis Atty.

J. L. HALL.
APPARATUS FOR TRANSMITTING AND RECEIVING INFORMATION.
APPLICATION FILED OCT. 5, 1907.
956,960.
Patented May 3, 1910.
7 SHEETS—SHEET 5.
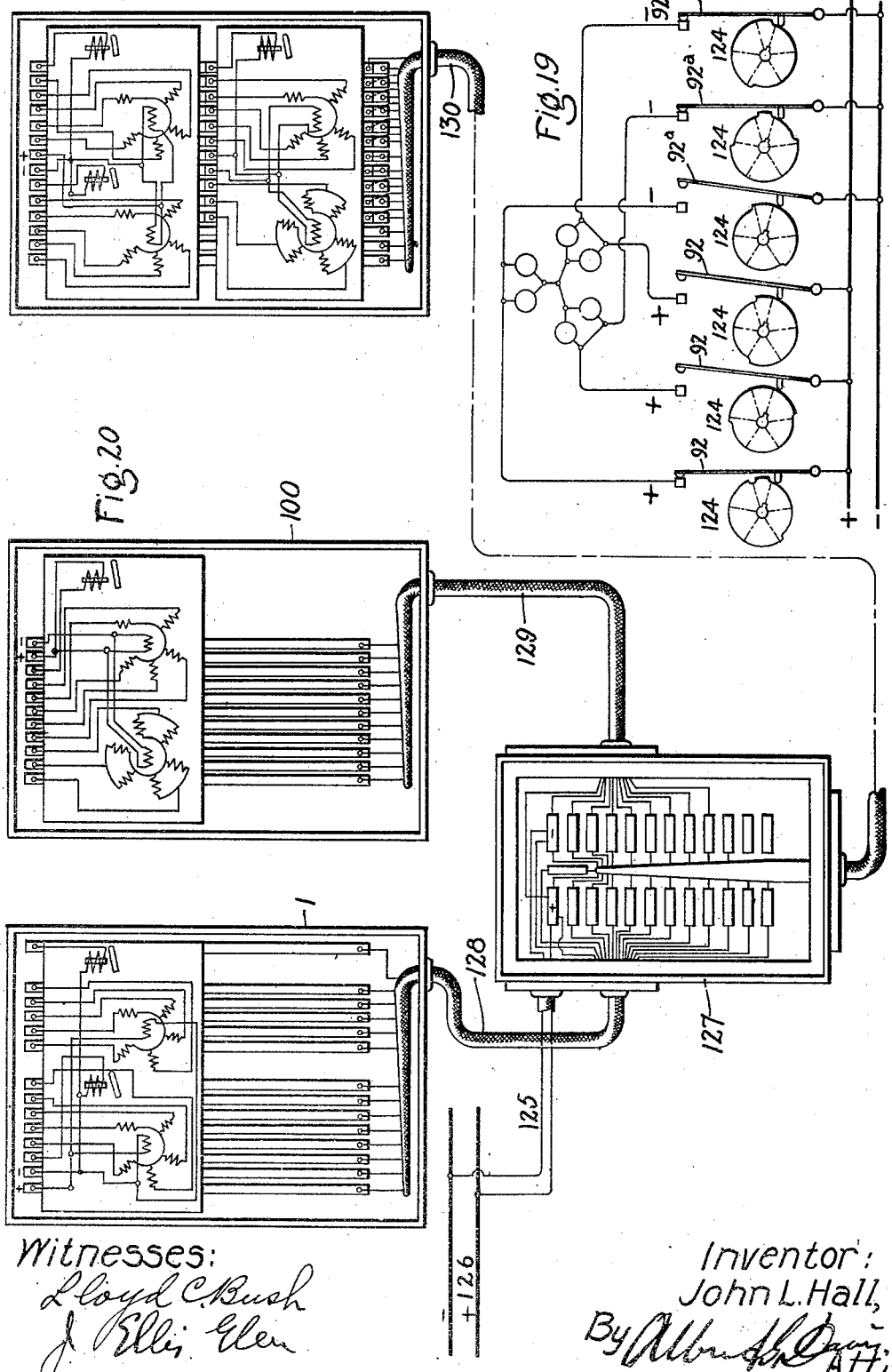
Witnesses:
Lloyd C. Bush
J. Ellis Glen
Inventor:
John L. Hall,
By Albert H. Adams
Atty.

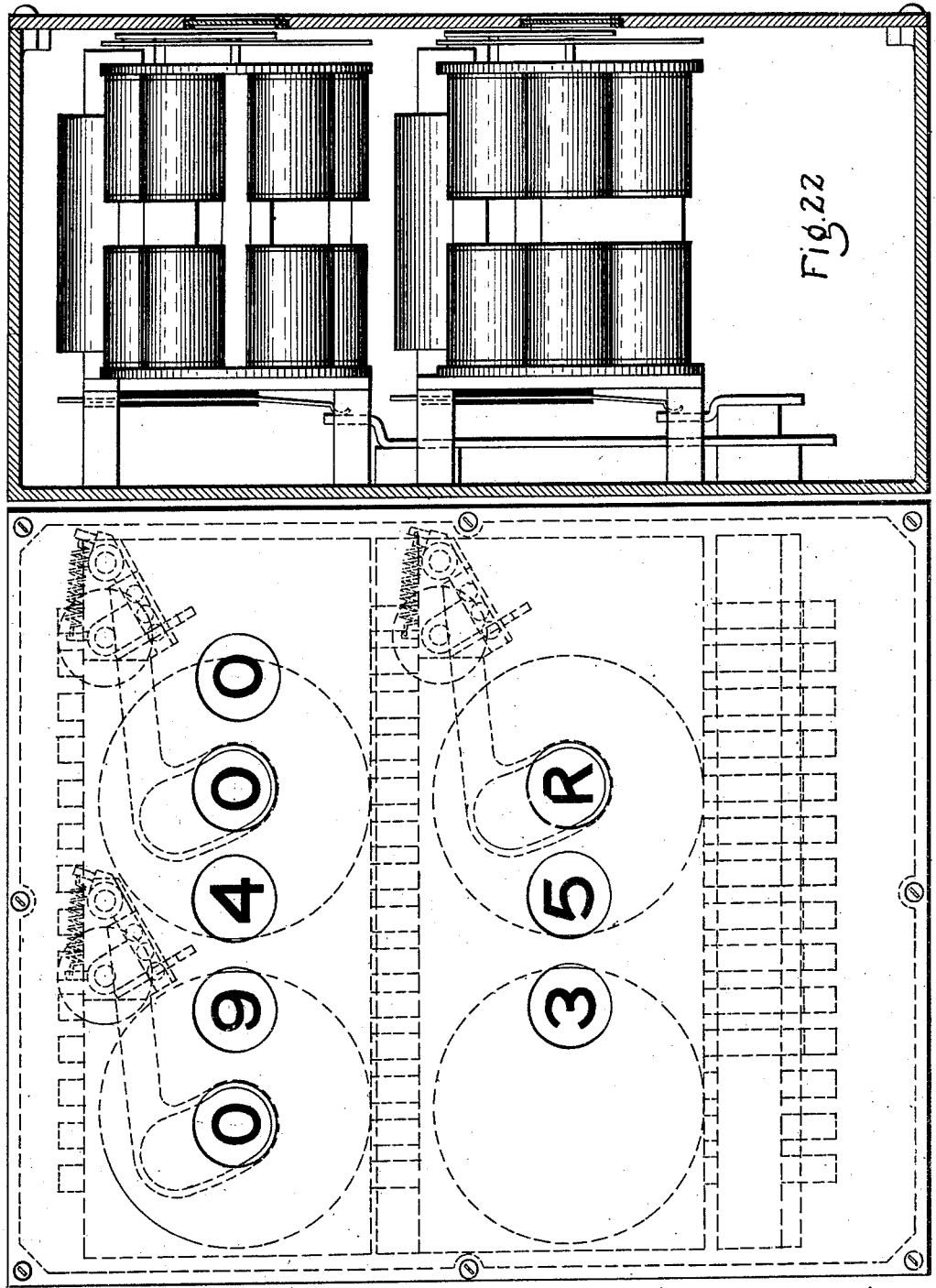

UNITED STATES PATENT OFFICE.

JOHN L. HALL, OF SCHENECTADY, NEW YORK, ASSIGNOR TO GENERAL ELECTRIC COMPANY, A CORPORATION OF NEW YORK.

APPARATUS FOR TRANSMITTING AND RECEIVING INFORMATION.

956,960.  Specification of Letters Patent.  Patented May 3, 1910.

Application filed October 5, 1907. Serial No. 396,088.

*To all whom it may concern:*

Be it known that I, JOHN L. HALL, a citizen of the United States, residing at Schenectady, county of Schenectady, State of New York, have invented certain new and useful Improvements in Apparatus for Transmitting and Receiving Information, of which the following is a specification.

This invention relates to devices for communicating intelligence from one point to another by means of synchronously-operating electromechanical appliances. It is especially designed for transmitting ranges and deflections from the bridge, conning tower or other station on a war ship to the various gun divisions, and will be hereinafter described in that connection, though it is obviously much broader in scope.

In order to properly train a gun mounted on a moving vessel so as to hit another moving vessel, the gunner must know not only the range but the amount of deflection to give his piece to compensate for the combined rates of motion of the two ships. For instance, if they are moving in opposite directions, one at twenty knots per hour and the other at fifteen knots, the deflection must be for a total movement of thirty-five knots, and the gunner must fire ahead of the other vessel at an angle corresponding to that speed in order to insure a hit. The sight on the gun is graduated for this purpose, so that if the gunner is given the combined speeds or the resultant speed, he can readily set the sight.

By means of my invention, both the range (in yards) and the deflection (in knots) can be accurately transmitted to the gunner. At the sending station and at the receiving station are rotatable dials each bearing the ten digits, and also oscillating targets bearing numbers and letters. Suitable sight holes permit these indicia to be viewed in various combinations.

In the apparatus hereinafter described, the variation in range is most conveniently made by increments of 50 yards from zero up to 19950. In the case of deflection, the variation may be from 50 knots left to 50 right. The transmitters for range and deflection are separate instruments containing hand-operated shafts which actuate switches controlling electromagnets at the sending and receiving stations connected in multiple so as to operate synchronously. These magnets move the numbered dials, and also the targets, so that both the sending and the receiving officers have a visual indication of the information communicated.

In the accompanying drawings, Figure 1 is a front elevation of the range transmitter with the cover removed, and certain parts shown in section; Fig. 2 shows a portion of the cover; Fig. 3 is a sectional side elevation of the range transmitter, taken on the line 3—3, Fig. 1; Fig. 4 is a partial section on the line 4—4, Fig. 1; Fig. 5 is a cross section of one of the motors; Fig. 6 is a longitudinal section of the same showing the armature and the coils for polarizing it; Fig. 7 is an elevation of one of the trains of carrying wheels; Fig. 8 is a plan view thereof; Fig. 9 shows the cam for controlling the "ten thousands" target; Fig. 10 is a front elevation of the deflection transmitter, with the cover removed; Fig. 11 is a diagram of circuits in said transmitter; Fig. 12 shows the detent and a portion of the star wheel coöperating therewith; Fig. 13 is a sectional side elevation of the deflection transmitter on the line 13—13, Fig. 10; Fig. 14 is a cross section of the "tens" motor; Fig. 15 is a horizontal longitudinal section of the reversing gear; Fig. 16 is a vertical cross section thereof; Fig. 17 is a front elevation of the reversing lever and the switch controlling the "L" and "R" target; Fig. 18 shows the manner in which the tumbler for actuating this lever is operated; Fig. 19 is a diagram of the circuits controlling the "tens" motor in the deflection transmitter; Fig. 20 is a general diagram of the connections between the two transmitters and the receiver; Fig. 21 is a front elevation of the receiver; Fig. 22 is a sectional side elevation of the same; and Fig. 23 is a detail of the deflection transmitter and Fig. 24 is a development of the entire series of cams in the deflection transmitter.

*The range transmitter.*—The mechanical construction of this instrument is shown in Figs. 1 to 9, inclusive. The parts are inclosed in a box 1, which has a removable front 2 containing five glazed sight-openings or windows 3ᵃ 3ᵇ 3ᶜ 3ᵈ 3ᵉ, through which the range numbers are read. The window $3^e$ at the right, occupying the units place, is a dummy, and has a zero painted on it, because the variations in range are by multiples of ten. Behind the "tens" window $3^d$ is a target 4, carrying the figure "5" and a zero, because the variations in range may for convenience be by increments of fifty. A similar target 5 is arranged behind the "ten thousands" window $3^a$, bearing a "1" and a zero, as the indications will not ordinarily reach 20,000. Behind the "hundreds" window $3^c$ and the "thousands" window $3^b$ are circular dials 6, 7, each bearing the ten digits in regular order, so that by the intermittent rotation of said dials the desired figures can be brought into view through said windows. In this way any number from 00000 up to 19950, varying by fifties, can be made to appear.

The targets are arranged in front of the dials, so that the figures on them may be brought conveniently near those on the dials. The target 4 is carried by a lever 8, pivoted at 9 and urged by a spring 10 toward a stop 11, in which position the figure "5" will be shown. When it is desired to expose the zero instead of the "5", an electromagnet 12 is energized, and this attracts an armature 13 secured to the lever and lifts it to the position shown in Fig. 1. The target 5 is carried by a lever 14, pivoted at 15, and urged by a spring 16 toward a stop 17. An armature 18 on the lever is attracted by an electromagnet 19 when the zero on the target is to be exposed.

The disks 6 7 are mounted respectively on shafts 20 suitably journaled in the frame of the instrument, and adapted to be rotated by electric motors. These comprise, preferably, five electromagnets 21, 22, 23, 24, 25 arranged equidistant in a circle, concentric with the shaft 20, each magnet being made in two portions with a curved pole piece 26 between them, concentric with said shaft. A polarized armature is mounted on the shaft, with its ends rotating close to said pole pieces 26. This armature is preferably composed of two radial portions 27, 28 extending in diametrically opposite directions. Between them the steel or iron shaft is cut and a non-magnetic section 29 is inserted. Surrounding each portion of the shaft adjacent to each portion 27, 28 is a coil 30. The two coils are in series and wound in the same direction so that the two portions 27, 28 of the armature are polarized with opposite signs. The ends of the armature are of the same width as the pole pieces 26, and each has a central notch 31 of the same width as the space between two adjacent pole pieces. The result is that in any given position of the armature one end will coincide with a pole piece, while the other end will be equally attracted by the two adjacent opposite pole pieces, as shown in Fig. 5. Suppose that the armature portion 27 is a north pole and the portion 28 a south pole. By energizing the electromagnets in groups of three, one on one side of the shaft and two on the other side, and making the pole pieces of opposite polarity to those of the armature, the latter can be caused to assume any given angular position. If the energization of the magnets takes place progressively, the armature will be rotated; while if the number of magnets energized on one side of the shaft be alternately one and two, and vice versa on the other side of the shaft, the armature will move intermittently half the distance between two magnets at each step. With five magnets, this gives ten positions of the armature in one revolution, so that at each step a new figure on the dial will be brought in line with the window. In such a progressive energizing of the magnets in groups of three, any given magnet will be of one polarity for three successive positions of the armature, then idle for the next two positions, then of the opposite sign for three successive positions, and then idle for the next two; these ten positions completing a single revolution of the armature. Now, in order to make the proper circuit connections to produce this intermittent rotating field of force, I provide a plurality of contact fingers actuated in proper sequence by a series of rotatable cams mounted on a common shaft. As there are two motors, one for the "hundreds" dial and one for the "thousands" dial, the cams for the two motors are placed on separate shafts, with means for causing one to make ten revolutions to one revolution of the other. By means of other cams on other shafts, properly geared to the aforesaid shafts, I cause the electromagnets 12 and 19 to be energized at the proper times to operate the targets 4 and 5. The preferred construction of this switching device will now be described.

A solid shaft 32 is journaled transversely in the box 1, and projects through one side thereof, where it is provided with a handle 32'. Sleeved on the shaft 32 are the concentric tubular shafts 33, 34, 35, each provided with its handle 33', 34', 35'. The shaft 35 is a short one and carries just inside the box 1 a single cam 36 having in its periphery a single notch 37. Above said cam is pivoted at 38 a lever 39 provided with a roller 40 which rests on said cam. Below the cam is a similar lever 41 pivoted at 42 and having a roller 43 running in contact with the cam. The rollers 40, 43 are diametrically opposite, so that only one can enter the notch 37 at any given position of the cam. The lever 39 carries an insulated spring contact finger 44, but the lever 41 is not so equipped. The lever 39 is urged toward the cam by a flat spring 45 attached at one end to the lever and at the other to a metallic bar 46 which extends across the box 1 and is supported by the brackets 47. The bar 46 is connected by a strip of metal 48 with an upright bar 49 which is in connection with the positive side of an electric power circuit. A similar bar 50 is connected with the negative side of the circuit, and is also connected by a strip 51 with a bar 52 running parallel with the bar 46 but below the lever 41. A flat spring 45' extends from the bar 52 and presses the lever 41 against the cam. The contact finger 44 is electrically connected with the bar 46 by means of the flat spring 45 and the screw shown in Fig. 4 at the left-hand end of the spring 45 which extends through the insulation which separates the spring 45 and finger 44. By the spring 45 the finger 44 also is urged toward a contact 53 on one end of a stationary contact piece 54 which is connected to one terminal of the electromagnet 12 by means of the screws 55, the contact spring 56, the conducting strip 57 and the contact spring 58. When the roller 40 rests in the notch 37 of the cam 36, as shown in Fig. 4, the finger 44 drops upon the contact 53 and closes the circuit through the magnet coil 12, thereby lifting the target 4 to the position shown in Fig. 1. When the cam is given a partial revolution, the roller 40 rides out of the notch, and the circuit of the magnet coil is broken, permitting the spring 10 to force the target downward and expose the figure "5". By giving the cam a half revolution the lower roller 43 will snap into the notch 37 and hold the cam in this position, so that it cannot shift accidentally.

In order to impart motion from the shaft 35 to the shaft 34, and cause the latter to rotate intermittingly, one-tenth of a revolution at a time, the shaft 35 is provided with a gear wheel 59 meshing with a gear wheel 60 of the same size which is mounted on a short shaft 61 suitably journaled in a support 62. This short shaft also carries a pin wheel 63, whose single pin 64 is arranged to engage with and actuate a ten-toothed star wheel 65 secured on the tubular shaft 34, which will thus be caused to make one revolution for every ten revolutions of the shaft 35.

The shaft 34 carries five cams 66 each arranged to actuate a pair of contact fingers 67 68, one finger 67 being connected with the positive bus bar 46 and the other, 68, with the negative bus bar 52. Each pair of fingers coöperates with one of the five electromagnets controlling the "hundreds" dial 6. Upon referring to the diagram Fig. 20, it will be seen that the windings of these electromagnets are all connected at one end, while their opposite ends lead to conducting strips. In Fig. 3 is shown one of these conducting strips, which is connected with a stationary contact bar 69 so arranged that the fingers 67 68 can make contact therewith. These fingers are similar in construction to the finger 44, being mounted on but insulated from a lever 70 on which is a roller 71 bearing upon the periphery of the cam 66.

Each cam has a cut-away portion 72 extending over an arc of 72 degrees plus the angular extent of the cam wheel or roller which drops into such cut-away portion or notch. Or in other words, the notch in the cam is of sufficient extent to permit the cam to turn through 72° and allow the wheel or roller which coöperates with the notch or cut-away portion to remain therein at each end of said arc of 72° with its center coinciding with the radial line which denotes the termination of the said arc. It, therefore, follows that during three successive positions of the cam one of the contact fingers, say 68, may remain closed upon the contact 69, giving the magnet a certain polarity. During the next two positions of the cam both fingers will be off the contact 69. During the next three positions the finger 67 will be closed on the contact 69, giving the magnet the opposite polarity, and during the two final positions (in any one revolution) both fingers will be off the contact 69. This sequence of circuit control insures the proper actuation of the polarized armature, as hereinafter set forth.

In order to enable the magnets to be energized in groups of three in proper order, the cams are so disposed on the shaft that the cut-away portion of each one is angularly displaced 72 degrees in advance of its predecessor. A single revolution of the shaft 34 will thus produce a single step-by-step revolution of the dial 6, bringing the figures thereon into view through the window 3ᶜ in regular order. The shaft 34 is geared to the shaft 33 by a train of gears, pin wheel and star wheel exactly similar to the train which connects the shafts 35 and 34. The shaft 33 carries a set of cams 73 similar to the cams 66, and operating in the same way to control the circuits of the electromagnets which operate the "thousands" dial 7. A similar train of gears, pin wheel and star wheel connects the shaft 33 with the shaft 32. On this latter shaft is a single cam wheel 74, containing five equidistant notches 75, with which coöperates a lever 76 carrying an insulated contact finger. When this finger drops upon the proper contact, it closes the circuit through the magnet coil 19 and actuates the target 5. If, then, the cam is rotated intermittingly, moving one-tenth of a revolution at each step, the magnet coil will be alternately energized and deënergized and will shift the target 5 ten times during one revolution of said cam; making it read alternately "1" and zero. The dials and targets may all be returned to zero by rotating the shafts backward by means of their handles, which are suitably graduated to indicate the zero position.

*The deflection transmitter.*—The mechanical construction of this is shown in Figs. 10 to 19, inclusive. The instrument is designed to indicate and transmit deflections varying from a maximum of 50 knots left to 50 knots right. There are two dials 77, 78, the former bearing the ten digits and the latter the first five digits and a zero. In addition to the dials, there is a target 79 bearing the letters "L" and "R". The target is constructed and operated like those in the range transmitter, being carried on a lever 80 fulcrumed at 81 and actuated by an electromagnet 82 and a spring 83. The dial 77 is operated by a polarized armature motor similar to those which operate the dials 6 and 7. The dial 78 is operated by the motor shown in Fig. 14, having three pole pieces 84 spaced 120 degrees apart, coöperating with a polarized armature 85 whose face is the same in length as a pole piece, and has a notch equal in width to the space between the pole pieces. For convenience in manufacture, two small electromagnets are connected to each pole piece instead of a single larger coil. By so connecting the electromagnets that one pole piece will be of one polarity and the other two of the opposite polarity, the armature will assume a position like that shown in Fig. 14, and by varying the grouping of the three pole pieces the armature will be rotated intermittingly, one-sixth of a revolution at each step.

The terminals at one end of the coils in each motor are connected in star, while those at the other end are each connected through leads 86, 87, 88, 89 with two studs 90, 90ª insulated from their supporting bar 91. Coöperating with each stud is a contact finger 92, 92ª insulated from its supporting lever 93 which is pivoted at 94 and has a roller 95 bearing against the periphery of a cam. The contact fingers are urged toward the studs by spring presser fingers 96, 96ª which also serve to convey current to said contact fingers. The presser fingers 96 are mounted on insulated metal supports 97 which are connected with the positive main of a supply circuit, while the presser fingers 96ª are supported by plates 97ª which are in circuit with the negative main. The cams which actuate the levers 93 are so designed that either one contact finger 92 or the other 92ª can be put in circuit with the lead going to any particular coil, but not both at the same time. If finger 92 is in contact with its stud 90 the lead will be connected to the positive main and the pole piece of the corresponding coil will be given, say, a north polarity; while if finger 92ª is on its stud 90ª, the opposite polarity will be produced.

The cams which actuate the contact fingers are all mounted on a shaft 98 which is journaled in brackets 99 suitably supported in a box 100 adjacent to the dials 77, 78 and their motors. The shaft is operated by a handle 101 attached to the outer end of a short shaft 102 which projects through the front of the box at right angles to the shaft 98. On the inner end of the short shaft is a bevel pinion 103 which meshes with two oppositely-faced bevel gears 104, 105 journaled to turn freely on the shaft 98. By means of a suitable clutch either one or the other of said gears can be clutched to the shaft 98, so that a continued rotation of the shaft 102 can be caused to rotate the shaft 98 in either direction. The object of this is to enable the operator to start at a deflection of, say, "50 L" and proceed down to zero and from that up to "50 R" without reversing the direction of rotation of the handle. The dials 77, 78, however, must rotate in one direction from "50 L" to zero and in the reverse direction from zero to "50 R." In other words, the shaft 98 must be reversed in rotation at the zero point in the scale, and this must be done automatically without reversing the actuating shaft 102. The preferred mechanism for accomplishing this will now be described.

The two bevel gears are provided with clutch teeth 106 to mesh with similar teeth on a sleeve 107 splined on the shaft 98 between said gears. A forked shifting lever 108 engages a groove in said sleeve, and is pivoted on a stud 109 projecting from the back of the box between said gears. The lever is actuated by a T-shaped tumbler 110 pivoted at the angle of the T on a stud 111 projecting from the back of the box radially to the shaft 98. The stem of the tumbler carries a wrist pin 112 engaging with a slot in the lever 108 so that when the tumbler 110 is turned it will move the lever and thereby shift the clutch sleeve from engagement with one wheel into engagement with the other. The tumbler is moved by means of notches 113 in rings 114 secured to the gears. The tumbler lies between these rings, and as its T-head is longer than the space between said rings, it stands normally at an angle thereto, as shown in Fig. 18. The notches 113 are so located that by the opposite rotation of the gear wheels said notches will come opposite each other at the instant the zero point is indicated by the deflection dials 77, 78. Springs 115 on the sides of the lever constantly urge the tumbler toward its midway position, as shown in Fig. 17, and when the notches approach their meeting point, the friction rollers 116 on the ends of the tumbler head are engaged thereby, so that as the notches pass they turn the tumbler. After the notches have drawn away from the tumbler, the latter remains locked between the rings until the gears are reversed and the notches meet again. The tumbler is pivotally connected to a switch lever 117 which controls the circuit of the electro-magnet 82 operating the target 79, so that when the tumbler shifts at the zero point in the indications, the target shifts also to change the letter from "L" to "R," or vice versa, as the case may be.

As the dial 78 must occupy six different positions, and the dial 77 must occupy ten positions for each one of five of the figures shown by the dial 78, plus one for the figure "5" thereon, the shaft 98 must make fifty successive steps in one direction of revolution starting at 00. To insure accuracy of position and prevent the parts from being jarred out of position by gun fire or other shocks, a detent is provided, preferably a spring-actuated plunger 118 cooperating with notches in a star wheel 119 secured to the shaft 98, preferably by means of studs 120 projecting from one side of a cam. Said star wheel contains sixty notches in its entire periphery, though only fifty-one of these are used in the operation of the transmitter.

In order to arrest the rotation of the shaft 98 when the dials show the number "50", a suitable stop is provided. This consists preferably of two dogs 121 each pivoted at one end and having its nose engaging with a screw-thread cut in the outer surface of a bevel gear; there being one dog for each gear. At the proper point in this screw-thread is inserted a pin 122 which strikes against the dog when the shaft has turned the proper number of degrees. As the forward rotation of the shaft from "50L" to the zero point of the dials and its subsequent reverse rotation to "50R" is effected by a constant rotation of the handle in one direction, it follows that the gear wheels each rotate through twice as many degrees as the shaft. This explains the necessity for the screw-threads, which swing the dogs out of the paths of the pins and permit them to pass at the middle of their travel. Since the pins prevent the completion of the second revolution of the gear wheels, the shaft must therefore turn through less than a complete revolution. For example, let it be assumed that the angular movement of the shaft is 325 degrees. This means that in each cam there will be an idle sector covering 35 degrees. Since there are five electromagnets in the motor operating the dial 77, and each electromagnet has its connecting lead provided with a positive branch and a negative branch, it requires ten cams to effect the circuit connections for this motor. For the same reason, six cams are necessary to produce the proper groupings of the three electromagnets in the motor which effects the five changes in the dial 78. The cams 123 which control the contact fingers for the dial 77 are of a different configuration from the cams 124 which control the dial 78.

It has been stated that in each cam there is an idle sector covering 35 degrees of the circumference. The cams 123 must produce five revolutions of the dial 77, that is to say, they must repeat the circuit connections for all the ten digits five times, and then repeat the connections for zero once more. The remaining 325 degrees on each cam is therefore divided into five equal sectors of 65 degrees each, and each sector is suitably notched to cause the proper circuit connections. It will be found that the first cam as shown in Fig. 23 (reading from left to right) has two notches, each covering six and a half degrees of arc (or one step) with an interval of 35 degrees between them, and also four notches, each covering 13 degrees of arc (two steps) with intervals of 52 degrees between themselves and between them and the other two notches. The remaining nine cams each have five notches, each covering 13 degrees of arc with four intervals of 52 degrees and one interval of 87 degrees. The eighth and ninth cams have also an additional notch corresponding with a single position and located respectively at opposite ends of the idle sector. Fig. 13 shows the fourth cam, the idle sector being indicated in dotted lines. In the actual embodiment of the apparatus each cut-away portion or notch is, of course, lengthened at each end beyond the number of degrees stated by an amount equal to the angular extent of the circular cam wheel or roller 95 which drops into said notch, so that when said roller rests at the end of a notch its center will coincide with the radial line intersecting the theoretical end of the notch.

The cams 124 which control the dial 78 are all shown in Fig. 19, the various sectors being indicated by dotted lines. These cams make only six circuit changes, but each arrangement of connections must be maintained during the changes of the dial 77. Inasmuch as all the cams on the shaft 98 rotate at the same peripheral speed, the depressions on the cams 124 must be long enough to allow for sufficient angular movement of the cams 123 to complete a rotation of the "units" dial 77 before shifting the "tens" dial 78.

Fig. 24 shows a development of all of the sixteen cams which operate the deflection transmitter. At the left-hand side of the figure is a scale of degrees showing that there is an idle sector covering 35 degrees and that the notches occupy the remaining 325 degrees. In this figure no allowance is made for the width of the roller, the notches being made to coincide with the radii denoting the exact number of degrees stated in the specification as being covered by each notch.

Both sets of cams are keyed on the shaft in such positions that they operate the contact fingers in a predetermined order. The first three cams 124 at the left in Figs. 10 and 19 control the three positive fingers for the three pole pieces of the motor for the dial 78. The next three cams 124 reading from the left, control the negative contact fingers for the same motor. The next five cams 123 (Fig. 10) control the positive contact fingers for the motor operating the dial 77, and the last five cams 123, the negative fingers for said motor.

*The range and deflection indicator.*—At each of the several gun stations is located a receiver comprising a combined range and deflection indicator, which is shown in front and side elevation in Figs. 21 and 22, respectively. The receiver consists of duplicates of the dials and targets and their motors and electromagnets similar in every respect to those embodied in the two transmitters. The circuit connections running to these parts in the two transmitters are continued to the receiver, so that the corresponding motive devices are connected in parallel and operate simultaneously. This fact is brought out in Fig. 20, which is a diagram of the circuits. The positive and negative leads 125 from the mains 126 enter a junction box 127 from which three cables are taken out, one of them, 128, containing one positive and one negative wire, and twelve connecting wires, all running to the range transmitter 1. Another cable, 129, runs to the deflection transmitter 100, and carries one positive and one negative wire, and nine connecting wires. The third cable, 130, runs to the receiver, and contains duplicates of all the connecting wires, besides a positive and negative conductor; twenty-three in all.

What I claim as new and desire to secure by Letters Patent of the United States, is,—

1. In an apparatus for sending and receiving information, a transmitter comprising two or more movable members bearing indicia, electromagnetic means for moving said elements, a plurality of switches controlling said means, and a plurality of rotatable cams for actuating said switches in a predetermined order.

2. In an apparatus for sending and receiving information, a transmitter comprising one or more rotatable dials and oscillatory targets, both bearing indicia, electromagnetic means for operating said dials and targets, a plurality of switches controlling said means, and a plurality of rotatable cams for actuating said switches in a predetermined order.

3. In an apparatus for sending and receiving information, a transmitter comprising a rotatable dial and an oscillatory target, both bearing indicia, individual electromagnetic means for operating said dial and target, and a plurality of switches controlling said means and arranged to cause an oscillation of said target at the completion of a predetermined movement of said dial.

4. In an apparatus for sending and receiving information, a transmitter comprising a rotatable dial, and means for rotating said dial comprising a plurality of electromagnets connected in parallel and having their pole pieces spaced at equal distances apart, and a polarized armature having bifurcated ends adapted to span the space between two pole pieces.

5. In an apparatus for sending and receiving information, a transmitter comprising a rotatable dial, and means for rotating said dial a certain number of equal angular movements comprising a set of field electromagnets in number equal to one-half of said movements, and a polarized armature having each pole of the same width as a field pole piece and containing a notch equal in width to the space between two field pole pieces.

6. In an apparatus for sending and receiving information, a transmitter comprising a rotatable dial, and means for rotating said dial a certain number of equal angular movements comprising a set of field electromagnets in number equal to one-half of said movements, a polarized armature having each pole of the same width as a field pole piece and containing a notch equal in width to the space between two field pole pieces, and means for energizing said field magnets in groups, a portion of each group coöperating with one pole of the armature and the rest with the other pole.

7. In an apparatus for sending and receiving information, a plurality of circuit-controlling elements, a shaft carrying the same, two bevel gears sleeved on said shaft, means for rotating them in opposite directions, a clutch for connecting one or the other to said shaft, and means for automatically shifting said clutch at the end of a predetermined angular movement of said shaft in either direction.

8. In an apparatus for sending and receiving information, a plurality of circuit-controlling elements, a shaft carrying the same, two bevel gears sleeved on said shaft, means for rotating them in opposite directions, a clutch for connecting one or the other to said shaft, a device for shifting said clutch, and means carried by said gear wheels for actuating said device.

9. In an apparatus for sending and receiving information, a plurality of circuit-controlling elements, a shaft carrying the same, two bevel gears sleeved on said shaft, means for rotating them in opposite directions, a clutch for connecting one or the other to said shaft, a lever for shifting said clutch, and tappets on said gear wheels for actuating said lever.

10. In an apparatus for sending and receiving information, a plurality of circuit-controlling elements, a shaft carrying the same, two bevel gears sleeved on said shaft, means for rotating them in opposite directions, a clutch for connecting one or the other to said shaft, a lever for shifting said clutch, and tappets on said gear wheels for actuating said lever, said tappets consisting of notched rings carried on said gears.

11. In an apparatus for sending and receiving information, the combination with a switch-operating shaft, of two bevel gears sleeved thereon, means for rotating them in opposite directions, a clutch for connecting one or the other to said shaft, a T-shaped tumbler adapted to shift said clutch, and rings on said gears engaging with the ends of said tumbler to lock it in position, said rings having notches which engage with and shift said tumbler as they pass each other.

In witness whereof, I have hereunto set my hand this 4th day of October, 1907.

JOHN L. HALL.

Witnesses:
BENJAMIN B. HULL,
HELEN ORFORD.